US012693939B2

(12) United States Patent
Mehta et al.

(10) Patent No.:  US 12,693,939 B2
(45) Date of Patent:       Jul. 28, 2026

(54) SYSTEM AND METHOD FOR CLONING AS SQL SERVER AG DATABASES IN A HYPERCONVERGED SYSTEM

(71) Applicant: Nutanix, Inc., San Jose, CA (US)

(72) Inventors: Tarun Mehta, Bangalore (IN); Rohan Mohan Rayaraddi, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 184 days.

(21) Appl. No.: 18/670,704

(22) Filed: May 21, 2024

(65) Prior Publication Data

US 2024/0378119 A1      Nov. 14, 2024

Related U.S. Application Data

(63) Continuation of application No. 18/114,427, filed on Feb. 27, 2023, now Pat. No. 12,019,523, which is a continuation of application No. 17/122,740, filed on Dec. 15, 2020, now Pat. No. 11,604,705.

(60) Provisional application No. 63/065,925, filed on Aug. 14, 2020.

(51) Int. Cl.
| | |
|---|---|
| *G06F 3/06* | (2006.01) |
| *G06F 11/1446* | (2026.01) |
| *G06F 16/27* | (2019.01) |

(52) U.S. Cl.
CPC ........ *G06F 11/1464* (2013.01); *G06F 3/0608* (2013.01); *G06F 3/065* (2013.01); *G06F 3/067* (2013.01); *G06F 16/273* (2019.01); *G06F 16/275* (2019.01); *G06F 2201/80* (2013.01)

(58) Field of Classification Search
CPC ............. G06F 11/1464; G06F 11/2094; G06F 3/0608; G06F 3/065; G06F 3/067; G06F 16/273; G06F 16/27; G06F 16/275; G06F 2201/80; G06F 8/71; G06F 9/45558; G06F 2009/45562; G06F 2009/45579
See application file for complete search history.

(56) References Cited

U.S. PATENT DOCUMENTS

| | | | |
|---|---|---|---|
| 4,742,482 | A | 5/1988 | Inskeep et al. |
| 6,542,893 | B1 | 4/2003 | Quernemoen |
| 6,766,477 | B2 | 7/2004 | Grucci et al. |

(Continued)

FOREIGN PATENT DOCUMENTS

| | | |
|---|---|---|
| EP | 2 980 707 A1 | 2/2016 |
| GB | 2 451 943 A | 2/2009 |

(Continued)

OTHER PUBLICATIONS

Communication under Rule 71(3) EPC for EP application 23159241.1, Oct. 2, 2025.

(Continued)

*Primary Examiner* — Khoa D Doan
(74) *Attorney, Agent, or Firm* — Foley & Lardner LLP

(57) ABSTRACT

A system and method include creating, by an Availability Group ("AG") controller in a virtual computing system, a first AG clone from a source database. The source database is stored on a primary replica node of an AG of the virtual computing system. The system and method also include creating, by the Controller, a second AG clone from the first AG clone and storing, by the Controller, the second AG clone on a secondary replica node of the AG. The second AG clone has a size of substantially zero.

20 Claims, 5 Drawing Sheets

(56)  References Cited

U.S. PATENT DOCUMENTS

| | | | |
|---|---|---|---|
| 7,046,134 B2 | 5/2006 | Hansen | |
| 7,136,865 B1 | 11/2006 | Ra et al. | |
| 7,331,000 B2 | 2/2008 | Ohno et al. | |
| 7,634,679 B2 | 12/2009 | Quintiliano | |
| 7,873,610 B2 | 1/2011 | Poulsen | |
| 7,873,684 B2 | 1/2011 | Souder et al. | |
| 7,941,470 B2 | 5/2011 | Le et al. | |
| 7,971,094 B1 | 6/2011 | Benn et al. | |
| 7,974,942 B2 | 7/2011 | Pomroy et al. | |
| 8,146,080 B2 | 3/2012 | Carter et al. | |
| 8,335,765 B2 | 12/2012 | Sivasubramanian et al. | |
| 8,572,031 B2 | 10/2013 | Merriman et al. | |
| 8,656,123 B2 | 2/2014 | Lee | |
| 8,656,303 B2 | 2/2014 | Hughes | |
| 8,713,060 B2 | 4/2014 | Sivasubramanian et al. | |
| 8,769,537 B1 | 7/2014 | Ruggiero et al. | |
| 8,775,438 B1 | 7/2014 | Brooker et al. | |
| 8,843,441 B1 | 9/2014 | Rath et al. | |
| 8,856,189 B1 | 10/2014 | Bull et al. | |
| 8,924,974 B1 | 12/2014 | Ruggiero et al. | |
| 9,116,737 B2 | 8/2015 | Aswathanarayana et al. | |
| 9,116,803 B1 | 8/2015 | Agrawal et al. | |
| 9,116,862 B1 | 8/2015 | Rath et al. | |
| 9,268,610 B2 | 2/2016 | Hegdal et al. | |
| 9,305,068 B1 | 4/2016 | Esposito | |
| 9,311,330 B1 | 4/2016 | Chockalingam et al. | |
| 9,405,634 B1 | 8/2016 | Ambastha et al. | |
| 9,529,808 B1 | 12/2016 | Sudarsanam et al. | |
| 9,582,297 B2 | 2/2017 | Jin et al. | |
| 9,621,680 B2 | 4/2017 | D'Costa et al. | |
| 9,830,082 B1 | 11/2017 | Srinivasan et al. | |
| 9,934,107 B1 | 4/2018 | Chikkanayakanahally et al. | |
| 10,061,852 B1 | 8/2018 | Plenderleith | |
| 10,078,465 B1 | 9/2018 | Wu et al. | |
| 10,108,496 B2 | 10/2018 | Hoobler et al. | |
| 10,162,715 B1 | 12/2018 | Mcalister et al. | |
| 10,206,092 B1 | 2/2019 | Mellquist et al. | |
| 10,235,250 B1 | 3/2019 | Ambastha et al. | |
| 10,261,867 B1 | 4/2019 | Terry et al. | |
| 10,268,551 B1 | 4/2019 | Wong | |
| 10,275,267 B1 | 4/2019 | De Kadt et al. | |
| 10,379,957 B2 | 8/2019 | Ngo | |
| 10,496,302 B1 | 12/2019 | Gaurav et al. | |
| 10,572,292 B2 | 2/2020 | Bhandari et al. | |
| 10,579,364 B2 | 3/2020 | Doshi et al. | |
| 10,705,755 B2 | 7/2020 | Wang et al. | |
| 10,785,255 B1 | 9/2020 | Otvagin et al. | |
| 10,824,522 B2 | 11/2020 | Sadavarte et al. | |
| 10,855,554 B2 | 12/2020 | Freeman et al. | |
| 10,922,957 B2 | 2/2021 | Rhoads et al. | |
| 10,949,309 B2 * | 3/2021 | Hajare | G06F 11/2094 |
| 10,965,737 B1 | 3/2021 | Parulkar et al. | |
| 10,984,041 B2 | 4/2021 | Bedadala et al. | |
| 11,036,696 B2 | 6/2021 | Higginson et al. | |
| 11,055,352 B1 | 7/2021 | Beitchman et al. | |
| 11,061,709 B2 | 7/2021 | Cao et al. | |
| 11,099,956 B1 | 8/2021 | Polimera et al. | |
| 11,100,020 B2 | 8/2021 | Shah et al. | |
| 11,120,011 B2 | 9/2021 | Priebe et al. | |
| 11,169,887 B2 | 11/2021 | Bajaj et al. | |
| 11,182,372 B1 | 11/2021 | Jain et al. | |
| 11,243,703 B2 | 2/2022 | Watkins | |
| 11,275,573 B1 | 3/2022 | Javadekar | |
| 11,308,114 B1 | 4/2022 | Moghe | |
| 11,320,978 B2 | 5/2022 | Kuchibhotla et al. | |
| 11,561,864 B1 | 1/2023 | Brahmadesam et al. | |
| 11,604,705 B2 | 3/2023 | Mehta et al. | |
| 11,604,806 B2 | 3/2023 | Mankad et al. | |
| 11,609,828 B2 | 3/2023 | Khandkar et al. | |
| 11,640,340 B2 | 5/2023 | Sontakke et al. | |
| 11,741,380 B2 | 8/2023 | Khawas et al. | |
| 11,816,066 B2 | 11/2023 | Kuchibhotla et al. | |
| 11,892,918 B2 | 2/2024 | Rayaraddi et al. | |
| 11,899,685 B1 | 2/2024 | Pandis et al. | |
| 11,907,507 B2 | 2/2024 | Kibo | |
| 12,010,227 B1 | 6/2024 | Chhabra et al. | |
| 12,019,523 B2 | 6/2024 | Mehta et al. | |
| 12,081,604 B1 | 9/2024 | Hinds et al. | |
| 12,093,715 B2 | 9/2024 | Zhao et al. | |
| 12,153,499 B2 | 11/2024 | Sontakke et al. | |
| 12,321,244 B1 | 6/2025 | Rather et al. | |
| 2002/0019920 A1 | 2/2002 | Reuter et al. | |
| 2002/0038554 A1 | 4/2002 | Monk et al. | |
| 2002/0082858 A1 | 6/2002 | Heddaya et al. | |
| 2003/0046353 A1 | 3/2003 | Chung et al. | |
| 2004/0059878 A1 | 3/2004 | Madany | |
| 2005/0027661 A1 | 2/2005 | Lober et al. | |
| 2006/0029096 A1 | 2/2006 | Babbar et al. | |
| 2006/0107006 A1 | 5/2006 | Green et al. | |
| 2006/0161462 A1 | 7/2006 | Sharma | |
| 2006/0161879 A1 | 7/2006 | Lubrecht et al. | |
| 2006/0242189 A1 | 10/2006 | Leetaru et al. | |
| 2006/0253472 A1 | 11/2006 | Wasserman et al. | |
| 2008/0059894 A1 | 3/2008 | Cisler et al. | |
| 2008/0239985 A1 | 10/2008 | Karve et al. | |
| 2009/0161547 A1 | 6/2009 | Riddle et al. | |
| 2009/0276771 A1 | 11/2009 | Nickolov et al. | |
| 2009/0276833 A1 | 11/2009 | Paul et al. | |
| 2009/0319582 A1 | 12/2009 | Simek et al. | |
| 2010/0017801 A1 | 1/2010 | Kundapur | |
| 2010/0023564 A1 | 1/2010 | Yerneni et al. | |
| 2010/0198791 A1 | 8/2010 | Wu et al. | |
| 2010/0251242 A1 | 9/2010 | Sivasubramanian et al. | |
| 2011/0099420 A1 | 4/2011 | Macdonald Mcalister et al. | |
| 2011/0138383 A1 | 6/2011 | Le | |
| 2011/0252420 A1 | 10/2011 | Tung et al. | |
| 2012/0084260 A1 | 4/2012 | Cherkauer et al. | |
| 2013/0019015 A1 | 1/2013 | Devarakonda et al. | |
| 2013/0031136 A1 | 1/2013 | Shah | |
| 2013/0091285 A1 | 4/2013 | Devarakonda et al. | |
| 2013/0110779 A1 | 5/2013 | Taylor et al. | |
| 2013/0232470 A1 | 9/2013 | Yung | |
| 2013/0232497 A1 | 9/2013 | Jalagam et al. | |
| 2013/0238331 A1 | 9/2013 | Mikan et al. | |
| 2013/0263119 A1 | 10/2013 | Pissay et al. | |
| 2013/0332251 A1 | 12/2013 | Ioannidis et al. | |
| 2014/0018947 A1 | 1/2014 | Ales | |
| 2014/0108339 A1 | 4/2014 | Marsden | |
| 2014/0108352 A1 * | 4/2014 | Ahrens | G06F 16/273 707/645 |
| 2014/0229504 A1 | 8/2014 | Kim et al. | |
| 2014/0250081 A1 | 9/2014 | Stewart et al. | |
| 2014/0337844 A1 | 11/2014 | Jin et al. | |
| 2015/0033223 A1 | 1/2015 | Chari et al. | |
| 2015/0127611 A1 | 5/2015 | Westerman et al. | |
| 2015/0188775 A1 | 7/2015 | Van Der Walt | |
| 2015/0188789 A1 | 7/2015 | Jayaprakash | |
| 2015/0207682 A1 | 7/2015 | Moraes Nichele et al. | |
| 2015/0207683 A1 | 7/2015 | Adogla | |
| 2015/0207703 A1 | 7/2015 | Gallagher et al. | |
| 2015/0254141 A1 | 9/2015 | Wertheimer et al. | |
| 2015/0339941 A1 | 11/2015 | Lu | |
| 2015/0370641 A1 * | 12/2015 | Susairaj | G06F 16/27 707/645 |
| 2016/0057077 A1 | 2/2016 | Gomatam et al. | |
| 2016/0066201 A1 | 3/2016 | Kerpez et al. | |
| 2016/0077925 A1 | 3/2016 | Tekade et al. | |
| 2016/0094401 A1 | 3/2016 | Anwar et al. | |
| 2016/0094410 A1 | 3/2016 | Anwar et al. | |
| 2016/0094647 A1 | 3/2016 | Mordani et al. | |
| 2016/0182328 A1 | 6/2016 | Bhasin et al. | |
| 2016/0188421 A1 | 6/2016 | Karinta et al. | |
| 2016/0191348 A1 | 6/2016 | Lee et al. | |
| 2016/0239637 A1 | 8/2016 | Miller et al. | |
| 2016/0246503 A1 | 8/2016 | Phelan et al. | |
| 2016/0248629 A1 | 8/2016 | Erdmann et al. | |
| 2016/0266913 A1 | 9/2016 | Achillopoulos | |
| 2016/0306840 A1 | 10/2016 | Deshmukh et al. | |
| 2016/0344582 A1 | 11/2016 | Shivanna et al. | |
| 2016/0378361 A1 | 12/2016 | Uriel | |
| 2017/0031775 A1 | 2/2017 | Arumugham et al. | |
| 2017/0039236 A1 | 2/2017 | Li et al. | |
| 2017/0068469 A1 | 3/2017 | Shankar et al. | |
| 2017/0091231 A1 | 3/2017 | Difranco et al. | |

(56) References Cited

U.S. PATENT DOCUMENTS

| | | |
|---|---|---|
| 2017/0199753 A1 | 7/2017 | Gong |
| 2017/0228227 A1 | 8/2017 | Winterfeldt et al. |
| 2017/0235563 A1 | 8/2017 | Bafna et al. |
| 2017/0243275 A1 | 8/2017 | Goens et al. |
| 2017/0262232 A1 | 9/2017 | Zhao et al. |
| 2017/0272359 A1 | 9/2017 | Behringer et al. |
| 2017/0315877 A1 | 11/2017 | Kaplingat et al. |
| 2017/0322827 A1 | 11/2017 | Little et al. |
| 2017/0344618 A1 | 11/2017 | Horowitz et al. |
| 2017/0357667 A1 | 12/2017 | Auch et al. |
| 2017/0371547 A1 | 12/2017 | Fruchtman et al. |
| 2018/0060119 A1 | 3/2018 | Zamir |
| 2018/0063088 A1 | 3/2018 | Hardy |
| 2018/0113622 A1 | 4/2018 | Sancheti |
| 2018/0121239 A1 | 5/2018 | Sawhney et al. |
| 2018/0121521 A1 | 5/2018 | Bivol |
| 2018/0173452 A1 | 6/2018 | Hu et al. |
| 2018/0203771 A1 | 7/2018 | Heidel et al. |
| 2018/0232142 A1 | 8/2018 | Shekar et al. |
| 2018/0270219 A1 | 9/2018 | Li |
| 2018/0285353 A1 | 10/2018 | Ramohalli Gopala Rao et al. |
| 2018/0293397 A1 | 10/2018 | Demember et al. |
| 2018/0300203 A1 | 10/2018 | Kathpal et al. |
| 2018/0324279 A1 | 11/2018 | Barton et al. |
| 2019/0116237 A1 | 4/2019 | Gibson |
| 2019/0121671 A1 | 4/2019 | Guim Bernat |
| 2019/0179711 A1 | 6/2019 | Luo et al. |
| 2019/0182213 A1 | 6/2019 | Saavedra et al. |
| 2019/0238412 A1 | 8/2019 | Vohra et al. |
| 2019/0238520 A1 | 8/2019 | Espinosa et al. |
| 2019/0245704 A1 | 8/2019 | Pala |
| 2019/0349194 A1 | 11/2019 | Fan |
| 2019/0361412 A1 | 11/2019 | Park et al. |
| 2019/0361748 A1 | 11/2019 | Walters et al. |
| 2019/0370146 A1 | 12/2019 | Babu et al. |
| 2020/0028932 A1 | 1/2020 | Yang et al. |
| 2020/0042293 A1 | 2/2020 | Elango et al. |
| 2020/0097325 A1 | 3/2020 | Vadapandeshwara et al. |
| 2020/0153898 A1 | 5/2020 | Sabath et al. |
| 2020/0162380 A1 | 5/2020 | Pilkington et al. |
| 2020/0201526 A1 | 6/2020 | Kuchibhotla et al. |
| 2020/0210379 A1* | 7/2020 | Kuchibhotla ....... G06F 11/1471 |
| 2020/0314173 A1 | 10/2020 | Pahwa et al. |
| 2020/0322425 A1 | 10/2020 | Sharma et al. |
| 2020/0351332 A1 | 11/2020 | Palladino et al. |
| 2020/0366661 A1 | 11/2020 | Mehta et al. |
| 2021/0005330 A1 | 1/2021 | Patil et al. |
| 2021/0034471 A1 | 2/2021 | Khandkar et al. |
| 2021/0051530 A1 | 2/2021 | Venkataraman et al. |
| 2021/0064591 A1 | 3/2021 | Sun et al. |
| 2021/0075700 A1 | 3/2021 | Palladino et al. |
| 2021/0135983 A1 | 5/2021 | Farnham |
| 2021/0141921 A1 | 5/2021 | Toplak |
| 2021/0141923 A1 | 5/2021 | Wu et al. |
| 2021/0194825 A1 | 6/2021 | Goodman et al. |
| 2021/0281428 A1 | 9/2021 | Kempf et al. |
| 2021/0328979 A1 | 10/2021 | M |
| 2021/0391999 A1 | 12/2021 | Chilamakuri et al. |
| 2021/0400533 A1 | 12/2021 | Kwok |
| 2021/0406132 A1 | 12/2021 | Gupta et al. |
| 2022/0004469 A1 | 1/2022 | Shen et al. |
| 2022/0050753 A1 | 2/2022 | Mehta et al. |
| 2022/0066993 A1 | 3/2022 | Khanuja et al. |
| 2022/0116445 A1 | 4/2022 | Filippou et al. |
| 2022/0311681 A1 | 9/2022 | Palladino et al. |
| 2022/0351169 A1 | 11/2022 | Kim et al. |
| 2022/0417205 A1 | 12/2022 | Nainar et al. |
| 2023/0065444 A1 | 3/2023 | Pyla et al. |
| 2023/0108625 A1 | 4/2023 | Yi et al. |
| 2023/0115093 A1 | 4/2023 | Zhou |
| 2023/0125754 A1 | 4/2023 | Willett et al. |
| 2023/0164567 A1 | 5/2023 | Fellows et al. |
| 2023/0214305 A1 | 7/2023 | Hockey et al. |
| 2023/0216736 A1 | 7/2023 | Almadani et al. |
| 2023/0231912 A1 | 7/2023 | Vohra et al. |
| 2023/0247087 A1 | 8/2023 | Nagaraja et al. |
| 2023/0251938 A1 | 8/2023 | Sontakke et al. |
| 2023/0344885 A1 | 10/2023 | Arnold et al. |
| 2023/0379699 A1 | 11/2023 | Oerton et al. |
| 2023/0418639 A1 | 12/2023 | Vaishnav et al. |
| 2024/0045585 A1 | 2/2024 | Kuchibhotla et al. |
| 2024/0045834 A1 | 2/2024 | Kuchibhotla et al. |
| 2024/0126777 A1 | 4/2024 | Tylik et al. |
| 2024/0134824 A1 | 4/2024 | Khanuja et al. |
| 2024/0161006 A1 | 5/2024 | Dey et al. |

FOREIGN PATENT DOCUMENTS

| | | |
|---|---|---|
| WO | WO-2010/106578 | 9/2010 |
| WO | WO-2020/026476 A1 | 2/2020 |

OTHER PUBLICATIONS

Enterprise Manager Lifecycle Management Administrator's Guide, "14 Cloning Oracle Databases and Pluggable Databases", https://web.archive.org/web/20170829005212/https://docs.oracle.com/cd/E24628_01/em.121/e27046/cloning_database.htm#EMLCM93230, 2017, Oracle.

Oracle®, "Oracle® Enterprise Manager Cloud Administration Guide 120 Release 5 (12.1.0.5)E28814-19", Dec. 2015 (Year: 2015).

"Creating Instances," Google Cloud ("Google") (Wayback Machine Capture, Sep. 18, 2018), available at https://www.archive.org/web/20180918103721/https://cloud.google.com/sql/docs/mysql/create-instance.

“Nutanix Era: Databases Made Simple, ” as archived by the Internet Archive on Sep. 26, 2020, available at http:/web.archive.org/web/20200926222827/https://www.nutanix.com/blog/nutanix-era-databases-made-simple.

“Taking a Backup Using Snapshots” (“LVM-Howto”) (Wayback Machine Capture, Jan. 20, 2007), available at https://web.archive.org/web/20070120200004/https://tidp.org/HOWTO/LVM-HOWTO/snapshots_backup.html.

“Windows Geo-Clustering: SQL Server, ” published Oct. 12, 2014.

7 more ways to Query Always on Availability Groups, as archived by the Internet Archive on Mar. 30, 2019, available at https://web.archive.org/web/20190330182441/https://sqlundercover.com/2019/02/19/7-more-ways-to-query-always-on-availability-groups/.

Amazon Relational Database Service User Guide (2016) (“RDS ”) (Wayback Machine Capture, Apr. 12, 2016), available at https://web.archive.org/web/20160412105355/http://docs.aws.amazon.com/AmazonRDS/latest/UserGuide/rds-ug.pdf.

Federal Court Management Statistics–Profiles, U.S. District Courts𠄼ombined Civil and Criminal (Dec. 2024).

Order Granting Defendant’s Motion to Compel Arbitration (staying the remaining claims) in *Nutanix, Inc.* v. *Tessell, Inc.*, Case No. 3:24-cv-01729 (N.D. Cal. Mar. 20, 2024).

SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.

The American Heritage Dictionary of the English Language (5th ed. 2011) ("Heritage").

Use the Availability Group Wizard (SQL Server Management Studio), as archived by the Interne Archive on Jan. 20, 2020, available at https://web.archive.org/web/20200120100053/https://docs.microsoft.com/en-us/sql/database-engine/availability-groups/windows/use-the-availability-group-wizard-sql-server-management-studio?view=sql-server-ver15.

Using Oracle Database Cloud Service – Creating a Database Deployment (2017) (“Oracle”) (Wayback Machine Capture, Jan. 18, 2017), available at https://web.archive.org/web/20170118071307/https://docs.oracle.com/en/cloud/paas/database- dbaascloud/csdbi/create-db-deployment.html.

Backupassist, "https://secure.backupassist.com/support/en/backupassist/manage/calendar.htm"; "https://secure.backupassist.com/ support/en/references/backup-schedules.htm", Jul. 1, 2017 (Year: 2017).

(56)                References Cited

OTHER PUBLICATIONS

Oracle, "https://web.archive.org/web/20170829005212/https://docs. oracle.com/cd/E24628_011em.121/e27046/cloning_database. htm#EMLCM93230", Aug. 29, 2017 (Year: 2017).
"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.
"Cloning a volume for an Amazon Aurora DB cluster", https://docs. aws.amazon.com/AmazonRDS/latest/AuroraUserGuide/Aurora. Managing.Clone.html.
"Dell PS Series Snapshots and Clones: Best Practices and Sizing Guidelines", Dell Storage Engineering, Nov. 2019, https://dl.dell. com/manuals/common/ps-series-snapshots-clones-bp1027_en-us. pdf.
"Enterprise Manager Cloud Administration Guide", Oracle Help Center, 2024, https://docs.oracle.com/cd/E24628_01/doc.121/e28814/cloud_db_clonesnap.htm#CEGCJCBC.
"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.
Maruthachalam, et al., "A Distributed System Design for Next Generation Storage and Remote Replication", 2014, https://ieeexplore. ieee.org/abstract/document/6814686.
"Recommended Practice for Patch Management of Control Systems", Steven Tom, Idaho National Laboratory, Dec. 2008, Cybersecurity Infrastructure Security Agency (CISA), US. Department of Homeland Security (Year: 2008).
High availability software—Wikipedia (Year: 2016).
Affidavit of Nathaniel E Frank-White, Aug. 10, 2024.
Expedia, Preferred Class Drop Down, www.expedia.com/.
Foreign Action other than Search Report on PCT Dtd Jan. 2, 2025.
Google, Creating Instances, Cloud SQL for MySQL, pp. 1-5.
McGraw-Hill Dictionary of Scientific and Technical Terms, recoil milking—recovery system, pp. 4, 6th edition.
MySQL, "Supported Platforms: MySQL Database", https://web. archive.org/web/20181106221826/https://www.mysql.com/support/supportedplatforms/database.html.
New Oxford American Dictionary, Third Edition, "authorized—avail", 4 pages, 2010.
*Nutanix* v. *Tessell*, "Civil Docket for Case 3:24-cv-01729-AMO".
*Nutanix* v. *Tessell*, "Order Setting initial Case Management Conference and ADR Deadlines", Northern District of California, Mar. 20, 2024.

Taking a Backup Using Snapshots, LVM HOWTO, Chapter 13 Recipes.
*Tessell* v. *Nutanix* IPR Power of Attorney.
*Tessell* v. *Nutanix*, IPR2025-00322, Dec. 18, 2024, pp. 7.
"Database Management Revolutionized by AI", OCI, https://www. oracle.com/artificial-intelligence/transform-database-management-with-ai/, Oct. 16, 2025.
"AI agents in Azure Cosmos DB", https://learn.microsoft.com/en-us/azure/cosmos-db/ai-agents, Mar. 9, 2025.
"MCP: Transform Database Admin Tasks with LLMs", https:// builder.aws.com/content/2umKOtgxiPzrAf0RzQOdnFhGedg/mcp-transform-database-admin-tasks-with-llms, Jun. 8, 2025.
Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.
Marodia, Democratizing database observability with AI-assisted troubleshooting, https://cloud.google.com/blog/products/databases/inside-ai-assisted-troubleshooting-for-databases, May 13, 2025.
"Database Management Revolutionized by AI", OCI, https://www. oracle.com/artificial-intelligence/transform-database-management-with-ai/, Oct. 16, 2025.
"AI agents in Azure Cosmos DB", https://learn.microsoft.com/en-us/azure/cosmos-db/ai-agents, Mar. 9, 2025.
"An SQL Server DBA’s Guide to Actifio GO", https://docs. actifio.com/static/Actifio-GO/PDFs/DBA_SQLServer.pdf, 2001.
"MCP: Transform Database Admin Tasks with LLMs", https:// builder.aws.com/content/2umKOtgxiPzrAf0RzQOdnFhGedg/mcp-transform-database-admin-tasks-with-llms, Jun. 8, 2025.
"Oracle Autonomous Database", White Paper Series, 13 pages, Sep. 2018.
"What are the future trends in DBMS technology? Advances in data and systems have led to the following advances in DBMS technology. ", https://aws.amazon.com/what-is/dbms/, Oct. 16, 2025.
Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.
Marodia, Democratizing database observability with AI-assisted troubleshooting, https://cloud.google.com/blog/products/databases/inside-ai-assisted-troubleshooting-for-databases, May 13, 2025.
Oracle, "Oracle Autonomous Database Technical Overview", Version [2.1], 20 page, Jul. 2020.
M. A. Murphy, M. Fenn, L. Abraham, J. A. Canter, B. T. Sterrett and S. Goasguen, "Distributed management of virtual cluster infrastructures," 2009 IEEE International Symposium on Parallel & Distributed Processing, Rome, Italy, 2009, pp. 1-8 (Year: 2009).

* cited by examiner

DASHBOARD 210

APPLICATION PROGRAMMING INTERFACE 230

CONTROLLER 205

PROCESSOR 245

MEMORY 250

DATABASE STORAGE SYSTEM 215

200

500

505 → START

510 → PROTECT SOURCE DATABASE

515 → TAKE SNAPSHOTS OF SOURCE DATABASE

520 → CREATE POINT IN TIME AG CLONE FROM SNAPSHOTS AND TRANACTIONAL LOGS

525 → BRING THE AG CLONE ONLINE

530 → TAKE SNAPSHOT OF THE AG CLONE UPON BRINGING ONLINE

535 → TAKE EMPTY LOG BACKUP OF THE AG CLONE

540 → APPLY THE EMPTY LOG BACKUP TO THE SNAPSHOT AND STORE ON SECONDARY REPLICA NODE

545 → END

SYSTEM AND METHOD FOR CLONING AS SQL SERVER AG DATABASES IN A HYPERCONVERGED SYSTEM

CROSS-REFERENCE TO RELATED PATENT APPLICATIONS

This application is a Continuation of U.S. patent application Ser. No. 18/114,427, filed on Feb. 27, 2023 which is a Continuation of U.S. patent application Ser. No. 17/122, 740, filed Dec. 15, 2020, which claims the benefit and priority to U.S. Provisional Patent Application No. 63/065, 925, filed Aug. 14, 2020, all of which are incorporated herein by reference in their entireties.

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a method is disclosed. The method includes creating, by a processor executing computer-readable instructions stored on a memory of a virtual computing system, a first Availability Group (AG) clone from a source database. The source database is stored on a primary replica node of an AG of the virtual computing system. The method also includes creating, by the controller, a second AG clone from the first cloned database and storing, by the Controller, the second AG clone on a secondary replica node of the AG. The second AG clone has a size of substantially zero.

In accordance with some other aspects of the present disclosure, a system is disclosed. The system includes an Availability Group (AG) in a virtual computing system, the AG having a primary replica node and at least one secondary replica node. The system also includes an Controller having a memory storing computer-readable instructions thereon and a processor that executes the computer-readable instructions to create a first AG clone from a source database. The source database is stored on the primary replica node. The processor further executes the computer-readable instructions to create a second AG clone from the first AG clone and store the second AG clone on the at least one secondary replica node. The second AG clone has a size of substantially zero.

In accordance with yet other aspects of the present disclosure, a non-transitory computer-readable media comprising computer-readable instructions stored thereon is disclosed. The computer-readable instructions when executed by a processor in a virtual computing system, causes the processor to create a first Availability Group (AG) clone from a source database, such that the source database is stored on a primary replica node of an AG, create a second AG clone from the first AG clone, and store the second AG clone on at least one secondary replica node of the AG. The second AG clone has a size of substantially zero.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
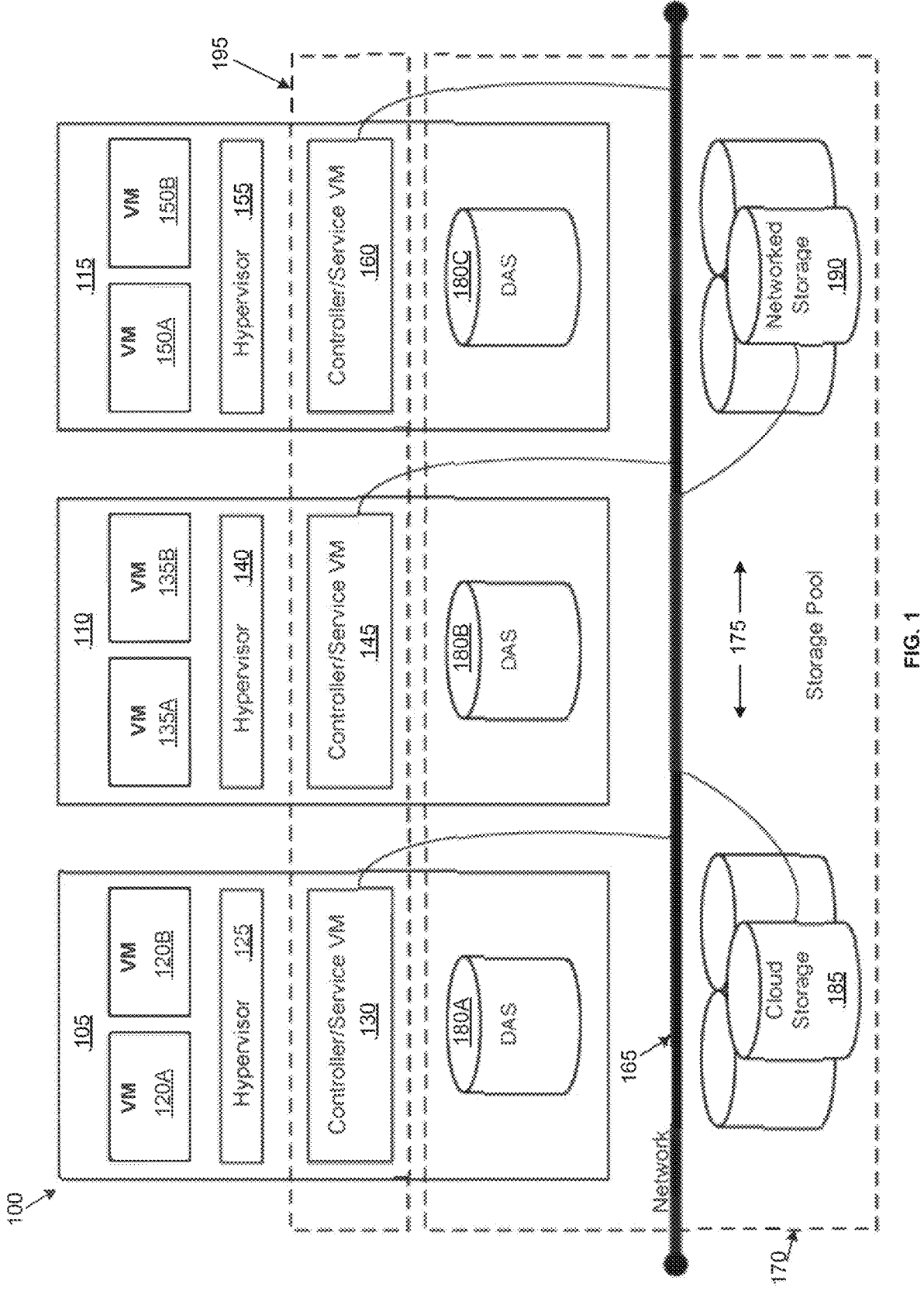
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a hyperconverged virtual computing system having a plurality of clusters, with each of the plurality of clusters having a plurality of nodes. Each of the plurality of nodes includes one or more virtual machines and other entities managed by an instance of a monitor such as a hypervisor. These and other components of the virtual computing system may be part of a datacenter, which may be managed by a user (e.g., an administrator or other authorized personnel). A distributed storage system, for providing storage and protection capabilities, may be associated with the virtual computing system. The virtual computing system may be configured for providing database management services.

In some embodiments, a client may enter into a Service Level Agreement ("SLA") with a site operator of a disaster recovery site for using the disaster recovery site. The disaster recovery site is a highly engineered and reliable virtual computing system that provides data recovery and data backup facilities to the client site in accordance with the SLA and maintains a continuity of operation of the client site in the aftermath of a disaster condition. A disaster condition may include planned outages, performance related failures, component failures, power failures, natural calamities, or any other condition that hampers the normal operation of the clusters at the client sites. Generally speaking, and as used herein, a disaster condition is any condition that causes hardware failure or otherwise prevents a hardware component from operating as intended, or results in a downtime at the client site. For example, a condition that causes a malfunction of any cluster at a client site or that significantly hampers the normal operation of any clusters is referred to as a disaster condition. The disaster condition is also referred to herein as a failover event. When the downtime of the client site is preplanned, the disaster condition or failover event may be a planned failover event. When the disaster condition of failover event is not preplanned, the disaster condition or failover event may be an unplanned failover event.

In some embodiments, the disaster recovery site may be part of an Always-On Availability Group ("AG") that provides replication of data to multiple locations. When a disaster condition is detected at one location, a replica of the data stored at another location may be used to maintain continuity of operation. Depending upon the number of locations at which the data is stored, and number of copies of the data at each location, significant storage resources may be needed to store all copies of the data. Such significant storage resources may be expensive to obtain and maintain. Further, as the amount of data increases, the number of locations to which the data is replicated increases, and/or the number of copies at each location increases, the amount of storage resources continues to increase. This continual increase and excess demand of storage resources may be impractical, and therefore undesirable.

The present disclosure provides technical solutions to greatly reduce the amount of storage resources needed in an Always-On AG for replicating data to multiple locations and making multiple copies of the data at each location. Specifically, the present disclosure provides a substantially zero sized AG clone, which may be replicated at multiple locations. Since the AG clone is substantially zero sized, the AG clone consumes essentially no extra space, thereby providing the ability to store data at any number of multiple locations and making any number of copies at each location at significantly lower storage cost.

In some embodiments, the present disclosure may be used in a test/development environment where a customer may want to setup and test their application functionality/simulation against an original or source database in its native configuration. Without the teachings of the present disclosure, to replicate the source database, the customer may consume a lot of additional space. For example, if an AG cluster with N nodes is desired, the source database may be copied to N nodes, requiring an extra storage space of (N–1)*size of the source database. Further, if multiple copies of the source database are desired on each node, the total storage space needed may be (N–1)*size of the source database*replication factor, where the replication factor is the number of copies needed on each node. Thus, depending upon the size of the source database, the number of nodes on which the source database is to be copied, and the number of copies desired on each node, the replication of the source database may consume a considerable amount of storage space.

With the present disclosure, the (N–1)*size of the source database*replication factor storage space may be significantly reduced by using AG clones, as discussed below. In a testing/development environment where minimal amounts of new data is being created, the AG clones may be used for the testing/development. Whenever the customer needs to get new data from the source database, a simple refresh of the environment (e.g., updating AG clones or creating new AG clones) may be performed. It is to be understood that testing/development is simply an example and is not intended to be limiting in any way. The AG clones may be used for other purposes as well.

Thus, the present disclosure provides an easy, convenient, cost effective, and user-friendly mechanism for creating and maintaining an Always-On AG cluster.

Referring now to FIG. 1, a cluster 100 of a hyperconverged virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes virtual machines ("VMs") 120A and 120B (collectively referred to herein as "VMs 120"), a hypervisor 125 configured to create and run the VMs, and a controller/service VM 130 configured to manage, route, and otherwise handle workflow requests between the various nodes of the cluster 100. Similarly, the second node 110 includes VMs 135A and 135B (collectively referred to herein as "VMs 135"), a hypervisor 140, and a controller/service VM 145, and the third node 115 includes VMs 150A and 150B (collectively referred to herein as "VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two VMs (e.g., the VMs 120, the VMs 135, the VMs 150) are shown on each of the first node 105, the second node 110, and the third node 115, in other embodiments, the number of the VMs on each of the first, second, and third nodes may vary to include other numbers of VMs. Further, the first node 105, the second node 110, and the third node 115 may have the same number of VMs (e.g., the VMs 120, the VMs 135, the VMs 150) or different number of VMS.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units or processors configured to execute instructions. The instructions may be carried out by a special purpose computer, logic circuits, or hardware circuits of the first node 105, the second node 110, and the third node 115. The processing units or processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units or processors, thus, execute an instruction, meaning that they perform the operations called for by that instruction.

The processing units or processors may be operably coupled to the storage pool 170, as well as with other elements of the first node 105, the second node 110, and the third node 115 to receive, send, and process information, and to control the operations of the underlying first, second, or third node. The processing units or processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units or processors may execute instructions without first copying the instructions to the RAM. Further, the processing units or processors may include a single stand-alone processing unit or processor, or a plurality of processing units/processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, and/or any other type of suitable primary and/or secondary memory. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the VMs 120, the VMs 135, and the VMs 150.

Each of the VMs 120, the VMs 135, the VMs 150 is a software-based implementation of a computing machine. The VMs 120, the VMs 135, the VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the VMs 120, the VMs 135, the VMs 150 that may run its own operating system and applications on the underlying physical resources just like a real computer. By encapsulating an entire machine, including CPU, memory, operating system, storage devices, and network devices, the VMs 120, the VMs 135, the VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the VMs 120, the VMs 135, and the VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the VMs 120, the VMs 135, the VM 150A, and the VM 150B) from the storage pool 170 to perform one or more functions.

By running the VMs 120, the VMs 135, and the VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new VMs are created (e.g., installed) on the first node 105, the second node 110, and the third node 115, each of the new VMs may be configured to be associated with certain hardware resources, software resources, storage resources, and other resources within the cluster 100 to allow those virtual VMs to operate as intended.

The VMs 120, the VMs 135, the VMs 150, and any newly created instances of the VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the VMs 120, the VMs 135, and the VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the VMs 120, the VMs 135, the VM 150A, and the VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular VM (e.g., the VMs 120, the VMs 135, or the VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
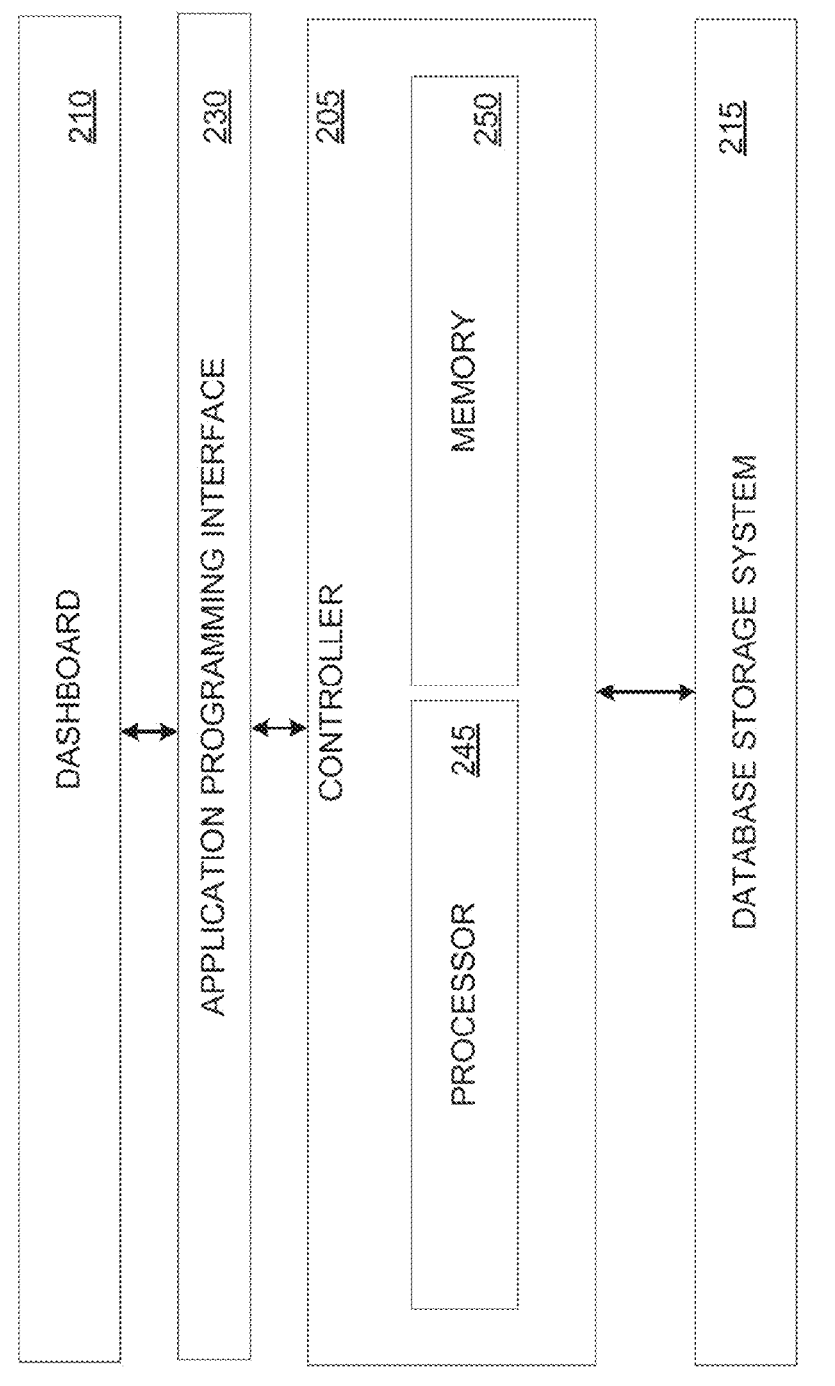
FIG. 2 is an example block diagram of a database protection system of the virtual computing system of FIG. 1, in accordance with some embodiments of the present disclosure.

Turning now to FIG. 2, an example block diagram of a database protection system 200 is shown, in accordance with some embodiments of the present disclosure. FIG. 2 is discussed in conjunction with FIG. 1. The database protection system 200 or portions thereof may be configured as utility software for implementing one or more database management services, such as database protection. Database protection may include creating and managing clones or copies of a database to allow continuity of operation when the underlying node hosting the database goes offline, as discussed in greater detail below. To provide database protection, the database protection system 200 includes a controller 205 that is configured to receive input from and provide output to a user via a dashboard 210. In some embodiments, the controller 205 may be an Era server or Era controller provided by Nutanix, Inc. In other embodiments, the controller 205 may be another type of Availability Group ("AG") controller or server that is suitable for performing the functions described herein. The controller 205 is also associated with a database storage system 215 that is configured to store one or more databases. In some embodiments, the database storage system 215 may be provisioned from the storage pool 170. In association with the dashboard 210 and the database storage system 215, the controller 205 is configured to implement one or more database protection services. For example, the controller 205 is configured to create an AG cluster and an AG clone to protect one or more databases stored within the database storage system 215.

In some embodiments, the database protection system 200 or at least parts thereof may be installed on and accessed via a VM (e.g., the VMs 120, the VMs 135, the VMs 150 of FIG. 1) of the cluster 100. In some embodiments, the database protection system 200 may be installed via the controller/service VM (e.g., the controller/service VM 130, the controller/service VM 145, the controller/service VM 160) of the node (e.g., the first node 105, the second node 110, and the third node 115) on which the database protection system is to be installed. For example, an administrator desiring to install the database protection system 200 may download a copy on write image file (e.g., qcow or qcow2 image file) on the controller/service VM to define the content and structure of a disk volume to be associated with the database protection system. In some embodiments, instead of a copy on write image file, another type of disk image file, depending upon the type of underlying hypervisor, may be installed. Further, the administrator may create or one or more new VMs on which the database protection system 200 is to reside. As part of creating the VMs, the administrator may allocate a particular number of virtual central processing units (vCPU) to each of the VMs, define the number of cores that are desired in each vCPU, designate a specific amount of memory to each of the VMs, and attach the database storage device (e.g., one or more virtual disks from the storage pool 170) with each of the VMs. In some embodiments, at least a portion of the database storage device attached to the database protection system 200 may form the database storage system 215. The administrator may also create a new network interface (e.g., associate a virtual local area network (VLAN), assign an Internet Protocol ("IP") address to access the database protection system 200, etc.) with each of the VMs. The administrator may perform additional and/or other actions to create the VMs on which the database protection system 200 resides upon creation and installation of the disk image file.

In some embodiments, the VMs on which the database protection system 200 resides may all be located on a single node (e.g., one of the first node 105, the second node 110, and the third node 115). In other embodiments, the VMs on which the database protection system 200 resides may be spread across multiple nodes within a single cluster, or possibly amongst multiple clusters. When spread across multiple clusters, each of the associated multiple clusters may be configured to at least indirectly communicate with one another to facilitate operation of the database protection system 200. Upon installing the database protection system 200, a user (e.g., the administrator or other user authorized to access the database system) may access the dashboard 210. The dashboard 210, thus, forms the front end of the database protection system 200 and the Controller 205 and the database storage system 215 form the backend of the database protection system.

The database protection system 200 may be accessed via a computing device configured to access the VM(s) on which the database protection system resides. In other embodiments, instead of or in addition to being accessible via a particular computing device, the database protection system 200 may be hosted on a cloud service and may be accessed via the cloud. In some embodiments, the database protection system 200 may additionally or alternatively be configured as a mobile application suitable for access from a mobile computing device (e.g., a mobile phone). In some embodiments, the database protection system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database protection system 200 is installed.

In some embodiments and when the dashboard 210 is configured for access via the API 230, the user may access the dashboard via a web browser and upon entering a uniform resource locator ("URL") for the API such as the IP address of the database protection system 200 or other web address. Using the API 230 and the dashboard 210, the users may then send instructions to the Controller 205 and receive information back from the database engine. In some embodiments, the API 230 may be a representational state transfer ("REST") type of API. In other embodiments, the API 230 may be any other type of web or other type of API (e.g., ASP.NET) built using any of a variety of technologies, such as Java, .Net, etc., that is capable of accessing the Controller 205 and facilitating communication between the users and the Controller. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database protection system 200 may be configured for access in other ways.

The dashboard 210 provides a user interface that facilitates human-computer interaction between the users and the controller 205. The dashboard 210 is configured to receive user inputs from the users via a graphical user interface ("GUI") and transmit those user inputs to the controller 205. The dashboard 210 is also configured to receive outputs/information from the controller 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database protection system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the Controller 205 to perform the functions described herein.

Thus, the dashboard receives a user request (e.g., an input) from the user and transmits that user request to the controller 205. In some embodiments, the user request may be to request creation of an AG cluster. For example, in some embodiments, the user request may request creation of a 3 node AG cluster having a replication factor of 2. In other words, the user request may request that a database or a group of databases be replicated to 3 separate nodes with each node having 2 copies of the database or group of databases. It is to be understood that the example above and any other examples used throughout the disclosure are only for explanation and are not intended to be limiting in any way. In response to the user request for creation of an AG cluster, the controller 205 may cause the database or the group of databases to be replicated to 3 nodes with a replication factor of 2. An example of an AG cluster is discussed in FIG. 3 below.

The controller 205 may be configured as a logic circuit, and/or operate in association with, hardware, software, firmware, or a combination thereof. Specifically, the controller 205 may include a processor 245 configured to execute instructions for implementing the database management services of the database protection system 200. The processor 245 may be implemented in hardware, firmware, software, or any combination thereof. "Executing an instruction" means that the processor 245 performs the operations called for by that instruction. The processor 245 may retrieve a set of instructions from a memory for execution. For example, in some embodiments, the processor 245 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 245 may be configured to execute instructions without first copying those instructions to the RAM. The processor 245 may be a special purpose computer, and include logic circuits, hardware circuits, etc. to carry out the instructions. The processor 245 may include a single stand-alone processing unit, or a plurality of processing units that use the same or different processing technology. The instructions may be written using one or more programming language, scripting language, assembly language, etc.

The controller 205 may also include a memory 250. The memory 250 may be provisioned from or be associated with the storage pool 170. In some embodiments, the memory 250 may be separate from the storage pool 170. The memory 250 may be any of a variety of volatile and/or non-volatile memories that may be considered suitable for use with the controller 205. In some embodiments, the memory 250 may be configured to store the instructions that are used by the processor 245.

Further, the controller 205 may be configured to handle a variety of types of database engines. For example, in some embodiments, the Controller 205 may be configured to manage PostgreSQL, Oracle, Microsoft SQL server, and MySQL database engines. In other embodiments, the controller 205 may be configured to manage other or additional database engines. Each database that is stored with the database protection system 200 may be of a particular "database engine type." The database engine type may identify the type of database management system (e.g., Oracle, PostgreSQL, etc.) of a particular database. By virtue of associating a database with a particular database engine type, that database is managed in accordance with the rules of that database engine type. Thus, the controller 205 is configured to be operable with and manage databases associated with a variety of database engine types. Although the present disclosure is discussed in the context of SQL database engine types, the present disclosure may be implemented for other types of database engine types as well.

It is to be understood that only some components of the controller 205 are shown and discussed herein. In other embodiments, the controller 205 may also include other components that are considered necessary or desirable in implementing the functions discussed herein. In other embodiments, the controller 205 may be other types of controllers or servers configured to perform the functions described herein.

Figure 3:
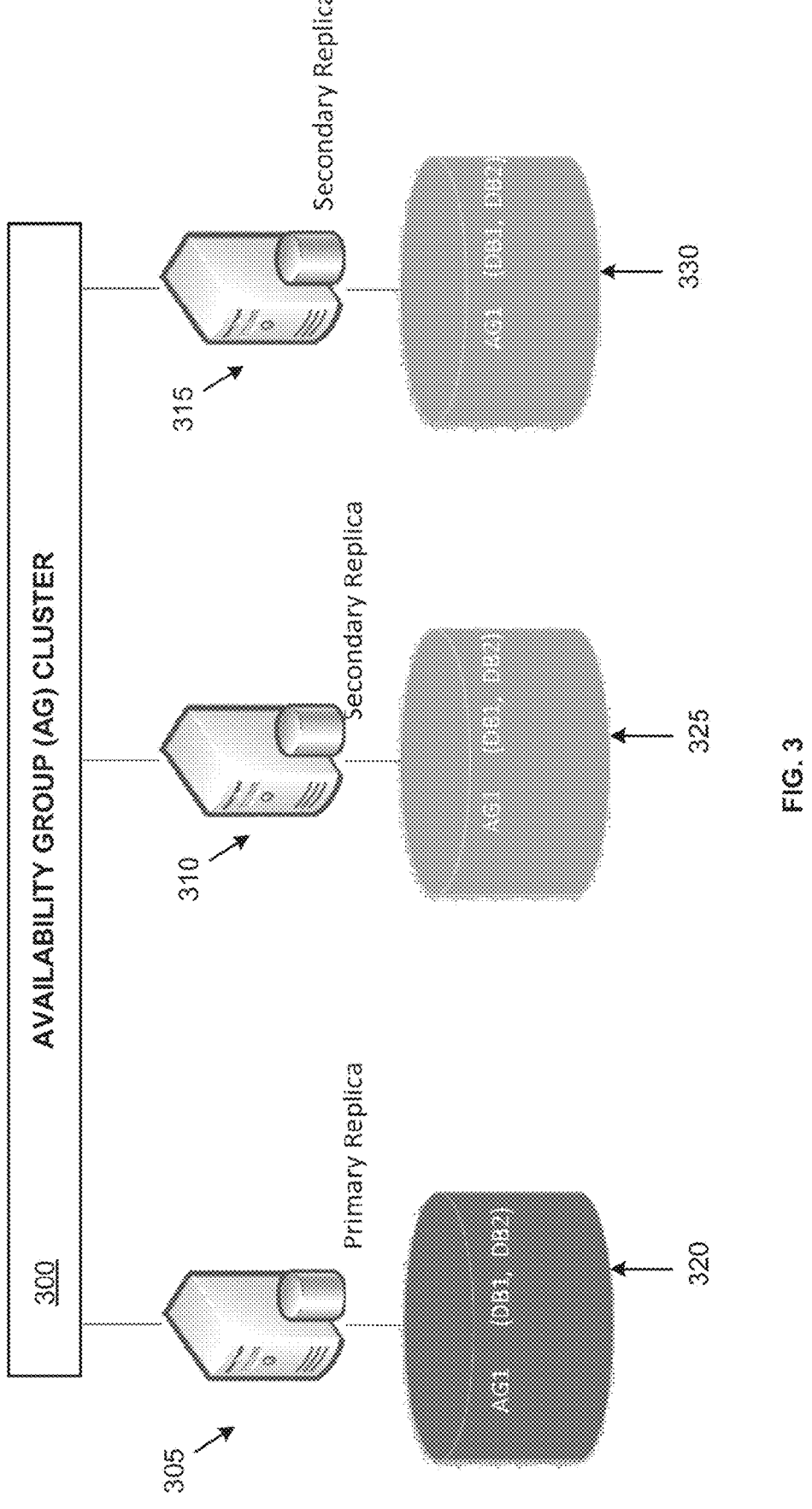
FIG. 3 is an example block diagram showing an Availability Group ("AG") cluster of the virtual computing system of FIG. 1, in accordance with some embodiments of the present disclosure.

Turning now to FIG. 3, an example block diagram of an AG cluster 300 is shown, in accordance with some embodiments of the present disclosure. The AG cluster 300 may be used to provide a replicated environment for a set of availability databases (e.g., a source database). By providing a replicated environment, the AG cluster 300 may store multiple copies of the set of availability databases (e.g., copies of the source database in multiple locations). Thus, in some embodiments, the AG cluster 300 may include a plurality of nodes for storing the multiple copies of the set of availability databases, and each of the plurality of nodes may be designated as either a primary replica node or a secondary replica node. For example, in some embodiments, the AG cluster 300 may include a primary replica node 305 and secondary replica nodes 310 and 315. Each of the primary replica node 305 and the secondary replica nodes 310 and 315 may have similar elements as the first node 105, the second node 110, and/or the third node 115. Because there are three total number of nodes (e.g., the primary replica node 305 and the secondary replica nodes 310, 315) in the AG cluster 300, the AG cluster provides an AG of 3. It is to be understood that in other embodiments, the AG cluster 300 may include greater than or less than two secondary replica nodes. In some embodiments, the AG cluster 300 may include greater than one primary replica node. In other words, the AG cluster 300 may have an availability group of greater than 3 or less than 3.

Further, in some embodiments, the primary replica node 305 and each of the secondary replica nodes 310 and 315 may be part of the same cluster (e.g., the cluster 100), while in other embodiments, one or more of the primary replica node and/or one or more of the secondary replica nodes may be part of separate clusters.

The AG cluster 300 is shown to include a set of availability databases 320 (e.g., DB1, DB2). Although the set of availability databases 320 is shown to include two databases (e.g., DB1, DB2), in other embodiments, the set of availability databases may include a single availability database or greater than two availability databases. Further, although the set of availability databases 320 are described as being stored on "nodes," it is to be understood that the set of availability databases are in fact stored on one or more storage devices associated with those "nodes." The one or more storage devices may be associated with one or more VMs installed on those "nodes." Thus, for example, the set of availability databases 320 may be stored within the storage pool 170, the database storage system 215, and/or stored in any other designated storage associated with the VMs on the primary replica node 305 of the AG cluster 300. The set of availability databases 320 may be hosted on the primary replica node 305 and replicated, for database protection, to the secondary replica nodes 310 and 315 of the AG cluster 300 as copies 325 and 330, respectively. It is to be understood that although the description above describes and FIG. 3 shows creating copies of the entire set of availability databases 320 (e.g., DB1, DB2), in some embodiments, copies of only a subset of the set of availability databases may be created. Thus, in some embodiments, one or more copies of one or more databases (e.g., DB1 or DB2) in the set of availability databases 320 may be created and stored on the secondary replica nodes 310 and 315. Further, although not shown, in some embodiments, one or more copies of one or more databases in the set of availability databases 320 may be stored on the primary replica node 305 as well.

In some embodiments, read/write operations on the databases (DB1, DB2) of the set of availability databases 320 may be performed on the primary replica node 305. In some embodiments, the copies 325 and 330 of the set of availability databases 320 on each of the secondary replica nodes 310 and 315, respectively, may be updated, synchronously or asynchronously, based on the set of availability databases on the primary replica node 305. Synchronous replication may entail updating the copies 325, 330 (or creating new copies and deleting the old ones) instantaneously or substantially instantaneously as changes are made to any database in the set of availability databases 320 on the primary replica node 305, thereby ensuring that the copies are constantly updated. Asynchronous replication may entail updating the copies 325, 330 (or creating new copies and deleting the old ones) on the secondary replica nodes 310 and 315 periodically (e.g., not instantaneously or substantially instantaneously).

By maintaining the copies 325 and 330 on the secondary replica nodes 310 and 315, respectively, when the primary replica node 305 becomes unavailable (e.g., due to a disaster condition), the set of availability databases 320 may be accessed and operated using the copies 325 and/or 330, thereby ensuring continuity of operation. In some embodiments, when the primary replica node 305 fails, the controller 205 may automatically switch to one of the secondary replica nodes 310 or 315, which may assume the role of the primary replica node. Thus, the secondary replica nodes 310 and 315 may be used for disaster recovery purposes. In some embodiments, in addition to disaster recovery or instead of disaster recovery, the secondary replica nodes 310 and 315 may be used for read balancing. For example, when the primary replica node 305 is servicing a high volume of read requests (e.g., read requests greater than a predetermined threshold) on the set of availability databases 320, and since read requests do not require modification of data, in some embodiments, at least some of those read requests may be serviced from the copies 325 and/or 330, respectively, to provide read balancing. By providing read balancing, read requests may be serviced faster without overloading the resources of the primary replica node 305. In some embodiments, the secondary replica nodes 310, 315 may be used for other purposes (e.g., testing, etc.)

Additionally, since in FIG. 3, a single copy (e.g., the copies 325 and 330) of the set of availability databases 320 exists on each of the secondary replica nodes 310, 315, the AG cluster 300 has a replication factor of 1. In other embodiments, more than one copy of the set of availability databases may be provided on one or more of the secondary replica nodes 310 and 315 to have a replication factor of greater than 1. In some embodiments, each of the secondary replica nodes 310 and 315 may have the same number of copies such that the replication factor of each of the secondary replica nodes is the same. In other embodiments, each (or at least some) of the secondary replica nodes 310 and 315 may have a replication factor that is different from the other secondary replica nodes. Thus, in some embodiments, the replication factor on the secondary replica node 310 may be different from the replication factor on the secondary replica node 315. Further, although not shown, the primary replica node 305 may also store a copy of one or more databases of the set of availability databases 320. The replication factor on the primary replica node 305 may be same as or different from the replication factor on the secondary replica nodes 310 and/or 315.

Figure 4:
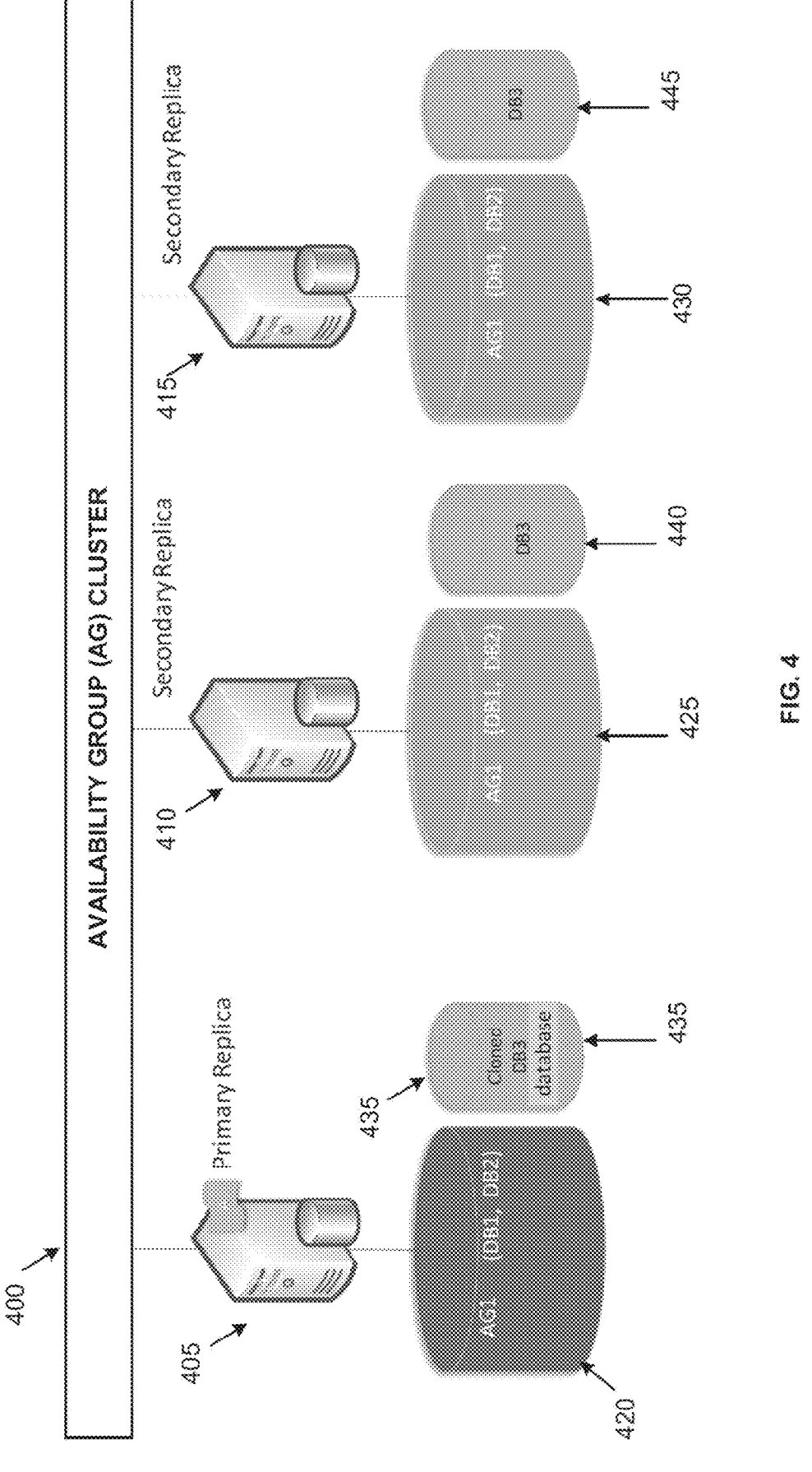
FIG. 4 is another example block diagram showing an AG cluster of the virtual computing system of FIG. 1, in accordance with some embodiments of the present disclosure.

Referring to FIG. 4, another example AG cluster 400 is shown, in accordance with some embodiments of the present disclosure. The AG cluster 400 is similar to the AG cluster 300 in that the AG cluster 400 also includes a primary replica node 405 that is equivalent to the primary replica node 305, and secondary replica nodes 410 and 415, which are equivalent to the secondary replica nodes 310 and 315, respectively. Also similar to the AG cluster 300, the primary replica node 405, the secondary replica node 410, and/or the secondary replica node 415 may be part of the same cluster or different clusters. The number of primary replica nodes and/or number of secondary replica nodes may also vary in other embodiments. Additionally and similar to the AG cluster 300, the AG cluster 400 provides a replicated environment to a set of availability databases 420 (e.g., DB1, DB2). Although two databases are shown in the set of availability databases 420, in other embodiments, the number of databases in the set of availability databases may vary. The set of availability databases 420 may be hosted on the primary replica node 405 such that read write operations may be performed on the set of availability databases from the primary replica node. Copies 425 and 430 of the set of availability databases 420 may be stored on the secondary replica nodes 410 and 415, respectively.

The AG cluster 400 also shows how one or more databases in the set of availability databases 420 on the primary replica node 405 may be replicated to the secondary replica nodes 410 and 415, while achieving storage savings. For example, say a replication factor of 2 is desired on each node, meaning that two copies of the one or more databases of the set of availability databases 420 are to exist on the primary replica node 405 and each of the secondary replica nodes 410 and 415. In some embodiments, to replicate the one or more databases of the set of availability databases 420 on the primary replica node 405 and each of the secondary replica nodes 410 and 415, a clone of the one or more databases of the set of availability databases 420 may be made. The clone may be called an AG clone.

To create an AG clone, all data used by the database/VM on which the set of availability databases 420 resides may need to be copied. In some embodiments, to create the clone of a database of the set of availability databases 420, a snapshot of that database (e.g., the storage disk or VM disk within which the data of the database is stored) may be captured to obtain a cloned disk. The cloned disk may be saved to the primary replica node 405 and each of the secondary replica nodes 410 and 415. In some embodiments, in addition to the snapshot, one or more transactional logs of the database being replicated may also be captured. Transactional logs may be captured between capture of two snapshots, such that the number of transactional logs that are captured are greater than the number of snapshots that are captured within a given time period. The transactional logs may then be applied to the cloned disk. Thus, a replicated point in time copy of the database may be created from a snapshot and one or more transactional logs. The frequency at which snapshots and transactional logs are captured may be defined based on a protection schedule associated with the set of availability databases 420.

For example, say the protection schedule defines capturing a daily snapshot of the set of availability databases 420 at 9:00 AM every day and capturing a transactional log of the set of availability databases every hour between the capture of two snapshots. Thus, to create a point in time clone of a database of the set of availability databases 420, say at 8:00 AM on Day 2, the snapshot captured at 9:00 AM the previous day (e.g., Day 1), as well as the transactional logs captured every hour since 9:00 AM on Day 1 to 8:00 AM on Day 2 may be used to create the cloned database of the set of availability databases.

Replicating one or more databases of the set of availability databases 420 as discussed above by creating/storing cloned disks, as well as applying transactional logs to each of the cloned disks may need a lot of storage space. For example, in some embodiments, if a database of the set of availability databases 420 that is being replicated is 500 Gigabytes ("GB") in size, to create three replicas of the database-one on each of the primary replica node 405 and the secondary replica nodes 410 and 415, an additional storage space of 500*3 GB or 1.5 Terabytes ("TB") may be needed. This may be expressed using the following formula for a point in time restore: ((N*size of data to be cloned)+ (N*size of log applied))*Replication Factor, where N is the number of nodes in the availability group (e.g., 3 in FIG. 4—one primary replica node and two secondary replica nodes), "size of log applied" is the total size of all the transactional logs that are applied to the cloned disk, the "size of data to be cloned" is the size of the database of the set of availability databases 420 being replicated at the instant the cloned disk is created, and the "Replication Factor" is the number of replicas of the database that are desired.

Depending upon the number of nodes in the availability group, as well as the replication factor that is desired, the amount of storage space needed to replicate the database may increase significantly. Consuming such large amounts of storage may not be practical, may be expensive to obtain and maintain, and therefore, generally undesirable. To avoid consuming such large amounts of storage space, while achieving the same benefits of replicating one or more databases of the set of availability databases 420, as discussed above, the present disclosure provides a substantially zero sized AG clone, which may be stored on the primary replica node 405 and the secondary replica nodes 410 and 415. By being substantially zero sized, the AG clone provides considerable space savings over the replication mechanism discussed above.

To create a substantially zero sized AG clone of a database of the set of availability databases 420, a linked cloned disk of the database may be created. The database whose AG clone is being created is referred to herein as a source database. An example of creating a linked cloned disk is described in U.S. application Ser. No. 15/885,758, titled "Cloning Services in Virtualized Computing Systems" and filed on Jan. 31, 2018, the entirety of which is incorporated by reference herein. In some embodiments, to create a linked cloned disk, a snapshot of the source database may be taken and the linked cloned disk may be created based on the snapshot. The linked cloned disk includes links, pointers, or references to memory blocks of the original storage disk associated with the source database. Thus, the linked cloned disk does not include a copy of the data of the source database. Rather, the linked cloned disk includes pointers to the storage disks of the source database. Further, to create the AG clone, in some embodiments, one or more transactional logs may be applied to the linked cloned disk. Thus, the AG clone may include a combination of a linked cloned disk and one or more transactional logs applied to the linked cloned disk. The one or more transactional logs may or may not have data therein. In other words, in some embodiments, the one or more transactional logs may be empty.

The AG clone created from the linked cloned disk to which one or more transactional logs have been applied may be brought online (e.g., restored). Once restored, the AG clone may reflects a point in time copy of the source database. A snapshot of the restored AG clone may be taken and that snapshot may be used to create additional AG clones. In some embodiments, the AG clone created from the linked cloned disk to which one or more transactional logs have been applied may be restored on the same node as the node on which the source database is stored (e.g., the primary replica node 405). The AG clone created from the linked cloned disk to which one or more transactional logs have been applied may be considered an initial AG clone. In other embodiments, the initial AG clone may be restored on one of the secondary replica nodes 410 or 415.

The additional AG clones that may be created from the initial AG clone may be stored on the primary replica node 405 and/or one or more of the secondary replica nodes 410, 415. The additional AG clones may include a linked cloned disk created from the snapshot taken from the initial AG clone. In contrast to the initial AG clone in which the one or more transactional logs that are applied to the linked cloned disk contain data, the transactional logs that are applied to the additional AG clones are empty. Since the snapshot taken from the initial AG clone reflects a point in time copy of the source database, the snapshot of the initial AG clone also reflects the point in time copy of the source database.

Thus, each of the additional AG clones includes the linked cloned disk to which an empty transactional log has been applied. Similar to the linked cloned disk of the initial AG clone, the linked cloned disks of each of the additional AG clones may include links, pointers, or references to the storage disks of the source database. Since the linked cloned disks of each of the initial AG clone and the additional AG clones contains pointers to memory blocks of the source database as opposed to storing actual data, the linked cloned disks may be considered substantially zero sized. Specifically, the linked cloned disks consume space that is needed for storing the pointers to the storage disks of the source database. The space consumed by these pointers may be considered negligible compared to the space needed by the actual data. Thus, the linked cloned disks may be considered essentially zero sized.

For example, in some embodiments, when a replication factor of 2 is desired, the initial AG clone may be stored on the primary replica node 405 and two copies of additional AG clones may be stored on each of the secondary replica nodes 410, 415. When access to the data of the source database using the initial AG clone or the additional AG clones is desired, the pointers in those AG clones may be used to access the memory blocks of the source database.

Thus, in some embodiments and as shown in FIG. 4, an initial AG clone 435 (e.g., DB3) of a source database (e.g., DB1 or DB2) may be created on the primary replica node 405. For purposes of explanation, the initial AG clone 435 is a clone of DB1. In other embodiments, a similar AG clone may be created for DB2 as well of the set of availability databases 420. To create the initial AG clone 435, a linked clone disk from the snapshot of the storage disk(s) associated with the source database (e.g., DB1) may be created. To this linked cloned disk, one or more transactional logs taken from the source database may be applied to obtain the initial AG clone 435. These one or more transactional logs contain data of the source database. Thus, the initial AG clone is a point in time copy of the source database. Further, the linked cloned disk of the initial AG clone 435 is essentially zero sized. However, since the transactional logs that are applied to the linked cloned disk contain data, the initial AG clone 435 consumes storage space that corresponds to the size of the transactional logs. In some embodiments, one or more storage disks may be associated with the initial AG clone 435. The initial AG clone 435 includes pointers to storage disk(s) of the source database where the data of the source database is stored. The initial AG clone 435 may be restored on the primary replica node 405. In other embodiments, the initial AG clone 435 may be restored on one of the secondary replica nodes 410, 415 instead. In some embodiments, the initial AG clone 435 may be associated with a separate virtual machine than the original source database (e.g., DB1).

Upon creating and restoring the initial AG clone 435, snapshots of the initial AG clone may be taken and may be used to create additional AG clones. Thus, a snapshot of the storage disk(s) of the initial AG clone 435 may be taken to create additional AG clones. Specifically, for each additional AG clone, a linked cloned disk may be created from the snapshot of the initial AG clone 435. Since the linked cloned disk only contains pointers, the linked cloned disks of the additional AG clones are substantially zero sized. In some embodiments, an empty transactional log may also be captured from the initial AG clone 435. An empty transactional log may not have any data therein, and therefore, may be zero sized or substantially zero sized.

The empty transactional log may be applied to the linked cloned disk created from the initial AG clone 435 to obtain an additional AG clone. The additional AG clone may be stored on the secondary replica nodes 410 and 415. For example, additional AG clones 440 and 445 (e.g., copies of DB3) may be created using the empty transactional log and the linked cloned disk captured from the initial AG clone 435. Since the linked cloned disk of each of the additional Ag clones 440, 445 is essentially zero sized and the transactional log is essentially zero sized (since there is no data therein), the additional AG clones are essentially zero sized. Thus, the additional AG clones 440 and 445 are the same point in time replicas of the source database as the initial AG clone 435 but consume a lower amount of storage space compared to the initial AG clone (e.g., since the additional AG clones have empty transactional logs while the initial AG clone has transactional logs with data). Continuing the example above of a 500 GB size for the source database, the initial AG clone 435 and the additional AG clones 440, 445, thus, consume one third the amount of space or a total of 0.5 TB space (e.g., the size of the transactional logs applied to the initial AG clone), thereby providing significant storage savings. In some embodiments, each of the additional AG clones 440 and 445 may be on separate virtual machines than the copies 425 and 430, respectively of the source database (e.g., DB1).

Thus, the present disclosure provides a mechanism to create an AG group with considerable space savings. Specifically, the present disclosure discloses a mechanism in which a first AG clone (e.g., the initial AG clone 435) is created from a source database in the set of availability databases 420. The first AG clone is a point in time copy of the source database. From the first AG clone, one or more second AG clones (e.g., the additional AG clones 440 and

445) may be created. These one or more second AG clones may also be the same point in copy of the source database as the first AG database. When data is desired to be read using the first AG clone or the one or more second AG clones, the pointer of the location from which the data is to be read may be used to access that location in the storage disk(s) of the source database. The data may then be read from the storage disk(s) of the source database. When data is to be written using the first AG clone or the one or more second AG clones, a new memory block may be created at the AG clone where the write operation is being performed. The data is written to that newly created memory block. In some embodiments, instead of creating the new memory block at the AG clone where the write operation is being performed, a new memory block may be created at the storage disk(s) of the source database and a pointer to that new memory block may be added to the linked cloned disk of that AG clone. Thus, each of the first and second AG clones may perform write operations without impacting the original data of the source database.

Figure 5:
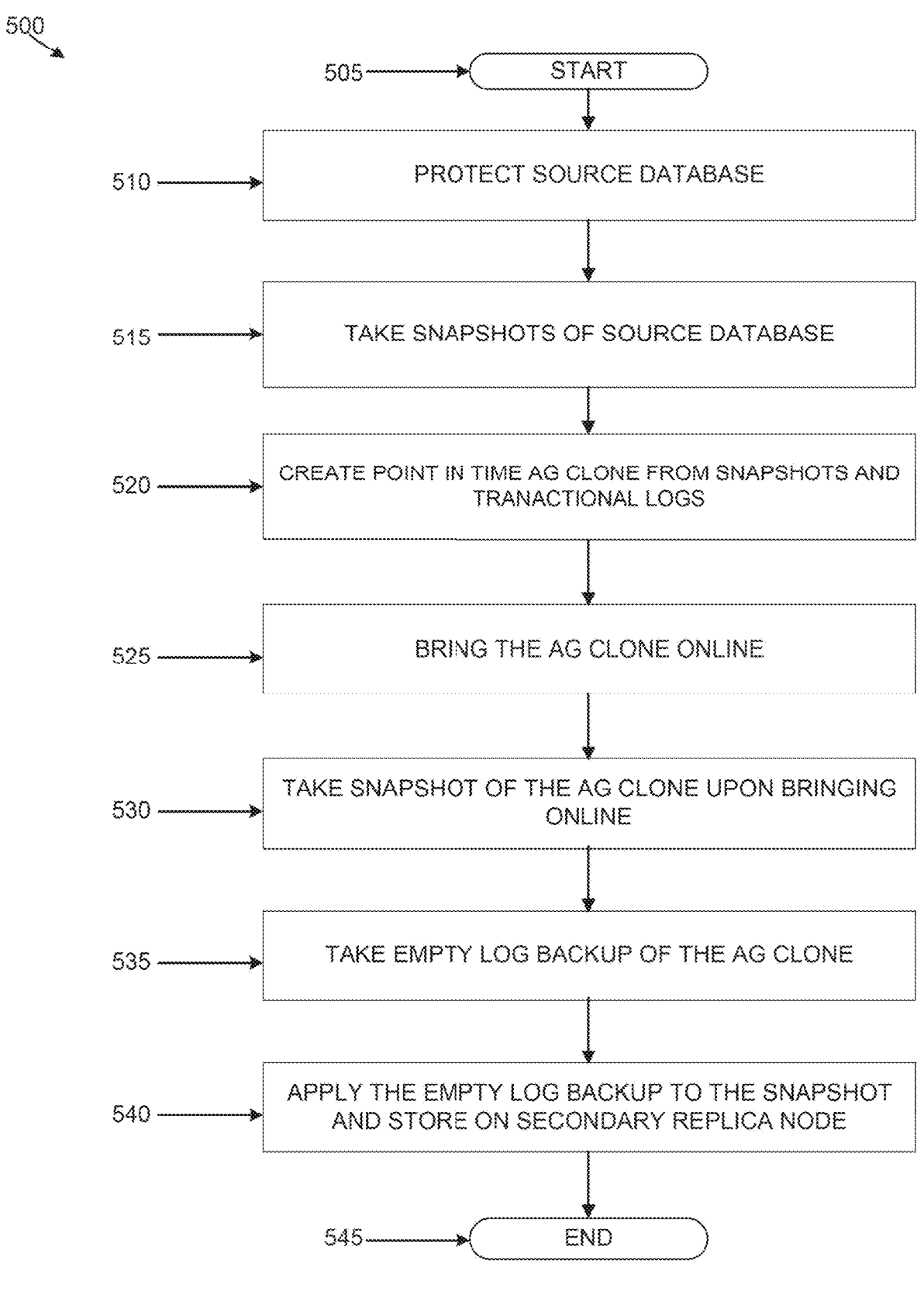
FIG. 5 is an example flowchart outlining operations for creating an AG clone in the AG cluster of FIGS. 3 and 4, in accordance with some embodiments of the present disclosure.

Turning now to FIG. 5, an example flow chart outlining operations of a process 500 is shown, in accordance with some embodiments of the present disclosure. The process 500 may include additional, fewer, or different operations, depending on the particular embodiment. The process 500 may be used to create AG clones of a source database in an AG cluster. The process 500 is discussed in conjunction with FIGS. 2-4 and is implemented by the controller 205 of FIG. 2. For purposes of explanation, the elements of the AG cluster 400 are used below. However, the process 500 may be applied to any AG cluster of any availability group size and any replication factor. The process 500 starts at operation 505 with an AG cluster (e.g., the AG cluster 400) having a plurality of nodes (e.g., 3), including a primary replica node (e.g., the primary replica node 405) and at least one secondary replica node (e.g., the secondary replica nodes 410, 415). The AG cluster 400 may also have a replication factor (e.g., 2) determining the number of copies (e.g., 2) of the source database that are needed on each of the primary replica node and the secondary replica nodes. In some embodiments, the number of nodes in the availability group and the replication factor may be user defined.

In some embodiments, a new AG cluster and a new AG may be defined on which AG clones according to the process 500 may be created and stored. In other embodiments, an existing AG cluster may be used. A new AG may be defined on the existing AG cluster to create and store the AG clones described herein. In yet other embodiments, the process 500 may be applied to an existing AG cluster and an existing AG.

In some embodiments, the set of availability databases 420 may reside primarily on the primary replica node 405. The source database (e.g., DB1) may be part of the set of availability databases 420. The source database may be associated with a virtual machine of the primary replica node 405. The virtual machine may be associated with one or storage disks (e.g., virtual disks) on which the data of the source database, as well as any metadata associated with the source database and the virtual machine is stored. Thus, in some embodiments, the source database may also reside on the primary replica node 405 and read/write operations may be performed on the source database during normal operations.

To create the AG cluster, the source database may be copied to one or more secondary replica nodes depending upon the number of nodes in the availability group. For example, if the number of nodes in the availability group is 3, the source database may be copied to two secondary replica nodes, such that the source database is located on 3 nodes (1 primary replica node and 2 secondary replica nodes). In addition, depending upon the replication factor, additional copies (e.g., AG clones) of the source database may be made on each of the primary and secondary replica nodes. In some embodiments, the AG clones may be "point in time" clones of the source database. In other words, the AG clones may be copies of the source database at a desired point in time. To create AG clones of the source database on the primary replica node 405 and the secondary replica nodes 410, 415, the source database needs to be protected.

To protect the source database, a protection schedule may be defined for the source database at operation 510. In some embodiments, the protection schedule may be user defined. The protection schedule may define a frequency of capturing snapshots and transactional logs. For example, in some embodiments, the protection schedule may define that X number of snapshots are to be captured within a designated time period. For example, the protection schedule may define that a snapshot is to be captured every day at 8:00 AM and at 8:00 PM.

However, the number of snapshots that are captured in a given day may be limited. Specifically, because capturing a snapshot requires quiescing (e.g., pausing) the source database and entering a safe mode in which user operations are halted, it is desirable to take only a minimum number of snapshots in a day. Thus, choices of state that may recreated from a snapshot may be limited. If a state is desired that falls between the capture of two snapshots, the user is generally out of luck. Thus, the desire to limit the number of snapshots in a day results in a significant technical problem that results in losing changes made to a database since the last snapshot capture or between two snapshot captures. Therefore, between two snapshot captures, one or more transactional logs of the source database may be captured. The protection schedule may define the frequency of capturing transactional logs. For example, the protection schedule may define that a transactional log is to be captured every hour. Thus, and continuing with the example above, every hour between 8:00 AM and 8:00 PM, a transactional log may be captured of the source database. In some embodiments, once the protection schedule is defined, the snapshots and transactional logs may be captured automatically by the Controller 205 (or another controller designated for protecting the source database) and stored within the storage pool 170 (or another designated storage device). In some embodiments, the protection schedule may be defined in accordance with the terms of a Service Level Agreement ("SLA").

At operation 515, snapshots of the source database may be taken. A snapshot stores the state of the source database at the point in time at which the snapshot is captured. The snapshot is thus a point in time image of the database. The snapshot may include a complete encapsulation of the virtual machine (e.g., the virtual disk(s) of the virtual machine) on which the database is created, including the configuration data of the virtual machine, the data stored within the database, and any metadata associated with the virtual machine. Any of a variety of snapshotting techniques may be used. For example, in some embodiments, copy-on-write, redirect-on-write, near-sync, or other snapshotting methods may be used to capture snapshots. For example, is some embodiments, the source database may be quiesced (e.g., paused) using, for example, a Virtual Shadow service (or other service). By quiescing the source database, updates to the source database may be paused. Once paused, any in-memory data may be flushed to the virtual disk(s), and an application consistent snapshot of the virtual disk(s) may be taken using one of the methods mentioned above.

In some embodiments, the virtual disk(s) associated with the virtual machine on which the source database is stored may be composed of or divided into one or more memory blocks. To capture a snapshot of the source database, images or copies of those memory blocks may be made. A copy of the memory blocks may be made by identifying the memory pointer (e.g., location) assigned to each memory block and copying the memory pointer to a repository. During a first snapshot of the memory blocks, the contents of all the memory blocks may be copied. From the snapshot, the source database may be recreated to the state at which the snapshot was captured.

At operation 520, one or more transactional logs of the source database may be captured. A transactional log may be a text, image, disk, or other type of file that records every transaction or change that occurs on the source database since a last snapshot capture or since the most recent transactional log capture. Thus, after the first snapshot is captured, transactional logs may be captured based upon the protection schedule to record all transactions or changes in the source database after the capture of the first snapshot. For example, say the protection schedule defines capturing 2 snapshots each day and 2 transactional logs between the 2 snapshot captures. If the source database includes 1000 memory blocks, the first snapshot creates copies (e.g., of pointers) of all the 1000 memory blocks.

If after capturing the first snapshot, 4 out of the 1000 memory blocks of the source database have changed (e.g., due to data being updated, new data being added, etc.), a first transactional log based upon the protection schedule may be captured. The first transactional log may reflect that the 4 blocks have changed since the first snapshot capture. Specifically, the first transactional log may include memory pointers to the 4 memory blocks that have changed. Thus, instead of copying all of the 1000 memory blocks, the first transactional log only copies the changes since the first snapshot capture, thereby saving space and time. Similarly, based upon the protection schedule, a second transactional log may be captured after the first transactional log. In some embodiments, the second transactional log may determine which memory blocks have changed since the first snapshot capture. For example, if 6 memory blocks have changed since the first snapshot capture, the second transactional log may include memory pointers back to the first snapshot indicating which 6 of the memory blocks have changed. In other embodiments, the second transactional log may determine which memory blocks have changed since the first transactional log capture and save those memory pointers instead.

When a second snapshot is captured, the transactional logs captured after the second snapshot may be relative to the second snapshot. By using a combination of snapshots and transactional logs, any state (e.g., point in time state) of the source database down to possibly the last second (or even fractions of seconds or other time granularities) may be recreated. Thus, states of the source database that fall between the capture of two snapshots may be recreated by using a combination of snapshots and transactional logs.

At the operation 520, a point in time first AG clone (e.g., the initial AG clone 435) of the source database is created using one of the snapshots and one or more transactional logs captured at the operation 515. For example, when the source database is cloned, say to a state when the second transactional log in the example above is captured, the first snapshot and the second transactional log may be used (if the second transactional log captures changes relative to the first snapshot. If the second transactional log captures changes with respect to the first transactional log, then both first and second transactional logs may be used). Specifically, from the memory pointers in the second transactional log, the particular memory blocks that have changed since the first snapshot may be determined. In the example above, the second transactional log includes memory pointers of the 6 memory blocks that have changed since the first snapshot capture. Thus, the first AG clone (e.g., the initial AG clone 435) may be created using the memory blocks from the first snapshot that have not changed plus the 6 memory blocks in the second transactional log that have changed. Thus, the first AG clone reflects an accurate state of the source database at the time of the second transactional log capture.

In some embodiments, the first AG clone (e.g., the initial AG clone 435) may be stored within the primary replica node 405 and may constitute the second copy of the source database on the primary replica node (e.g., to satisfy a replication factor of 2). In other embodiments, the first AG clone (e.g., the initial AG clone 435) may be stored on other nodes (e.g., the secondary nodes 410, 415). Additional AG clones of the source database may now be made using the first AG clone (e.g., the initial AG clone 435) for storing either on the primary replica node 405 and/or on the secondary replica nodes 410, 415.

To create the additional AG clones from the first AG clone (e.g., the initial AG clone 435), upon creating the first AG clone, at operation 525, the first AG clone may be made operational and a protection schedule may be associated therewith. By defining a protection schedule for the first AG clone (e.g., the initial AG clone 435), snapshots and transactional logs may be captured of the first AG clone. For example, snapshots and transactional logs may be captured from the virtual or storage disk(s) associated with the first AG clone (e.g., the initial AG clone 435) similar to the capturing of snapshots and transactional logs from the source database. In some embodiments, the first AG clone (e.g., the initial AG clone 435) may be created and brought online at the point in time at which the replication of the source database is desired. For example, the first AG clone (e.g., the initial AG clone 435) may be created/brought online at Time A at which the replication of the source database is desired. Thus, the first AG clone (e.g., the initial AG clone 435) may reflect the state of the source database at Time A.

At operation 530, to create the additional AG clones (e.g., the second AG clones) on the secondary replica nodes 410 and 415 to satisfy the replication factor of 2, a snapshot of the first AG clone (e.g., the initial AG clone 435) is taken to create a linked cloned disk. The linked cloned disk includes links/pointers to data that is stored within the storage disk(s) of the first AG clone (e.g., the initial AG clone 435), which in turn includes links/pointers to storage disk(s) of the source database. Thus, the linked cloned disk created from the first AG clone (e.g., the initial AG clone 435) directly or indirectly contains pointers to the storage disk(s) of the source database. At operation 535, an empty log backup of the first AG clone (e.g., the initial AG clone 435) is taken. The empty log is a transactional log with no data therein. Thus, the empty log may be considered zero sized. In some embodiments, the empty log backup may be taken at or about the same time as the snapshot of the operation 530. At operation 540, the snapshot captured at the operation 530 may be cloned (e.g., saved) onto the secondary replica nodes 410 and 415, and the clones may be put into a restoring mode using the Virtual Shadow Service (or another service).

The cloned disk of the operation 530 and the empty log captured at the operation 535 may be copied to the secondary replica nodes 410 and 415. The empty log may be applied to the linked cloned disk at the secondary replica nodes 410 and 415 to obtain the second AG clones (e.g., the additional AG clones 440 and 445). Since the linked cloned disk copied to the secondary replica nodes 410 and 415 is a linked cloned disk, which is essentially zero size (e.g., a minimal/negligible amount of space is consumed by the links/pointers), and the empty log is zero sized, each of the second AG clones (e.g., the additional AG clones 440 and 445) created from the linked cloned disk and the empty log may be considered zero sized (or substantially zero sized).

Using the process 500, the total storage space needed for all the AG clones (e.g., the first AG clone+each of the second AG clones) may be given by the following formula: ((1*size of log applied)+(N*size of empty log backup))*Replication Factor, where N is the number of nodes in the AG, "size of log applied" is the size of the transactional log applied to create the first AG clone (e.g., the initial AG clone 435), and the "size of empty log backup" is the size of the empty log captured at the operation 535 and applied to create each of the second AG clones (e.g., the additional AG clones 440, 445). The above formula does not include the space consumed by the links/pointers of each of the linked cloned disks of the first and second AG clones. However, as indicated above, the storage space consumed by these links/pointers may be considered essentially zero sized compared to the size of the actual data.

Since the linked cloned disks are essentially zero sized, and since the empty transactional logs (e.g., the empty log) are zero sized, and since size of source database>>size of non-empty transactional log applied>>size of empty log, the second AG clones (e.g., the additional AG clones 440 and 445) are essentially zero sized, thereby consuming little to no extra storage space. Further, the first AG clone (e.g., the initial AG clone 435) only consumes the storage space needed for the transactional logs. The linked cloned disk of the first AG clone (e.g., the initial AG clone 435) is essentially zero. Thus, even the first AG clone (e.g., the initial AG clone 435) offers considerable space savings compared to a conventional clone. The process 500 ends at operation 545. Thus, by using substantially zero sized cloned databases in the AG, the present disclosure provides considerable space savings while still providing all the advantages of the AG.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   capturing, by a processor executing computer-readable instructions stored on a memory, a first snapshot of a source database on a first node;
   capturing, by the processor, one or more transactional logs of one or more changes in the source database;
   creating, by the processor, a point-in-time clone from the first snapshot and the one or more transactional logs; and
   capturing, by the processor, a second snapshot of the point-in-time clone and, using the second snapshot, creating a second clone on a second node.

2. The method of claim 1, wherein creating the point-in-time clone includes applying, by the processor, the one or more transactional logs to the first snapshot.

3. The method of claim 1, further comprising:
   storing, by the processor, the point-in-time clone on the first node.

4. The method of claim 3, wherein the first node is located in a first location and the second node is located in a second location different from the first location.

5. The method of claim 3, further comprising storing, by the processor, one or more copies of the second clone on additional nodes.

6. The method of claim 1, further comprising capturing, by the processor, the first snapshot at a first predetermined time and capturing the second snapshot at a second predetermined time according to a protection schedule associated with the source database.

7. The method of claim 1, wherein the point-in-time clone and the second clone reflect a state of the source database when the first snapshot was captured.

8. The method of claim 1, wherein a size of the first clone is greater than the size of the second clone.

9. The method of claim 1, wherein the point-in-time clone includes pointers to data of the source database, and wherein the second clone includes pointers to data of the point-in-time clone.

10. The method of claim 1, further comprising:
    storing, by the processor, the first clone and one or more copies of the first clone on the first node based on a first replication factor; and
    storing, by the processor, the second clone and one or more copies of the second clone on the second node based on a second replication factor.

11. A system comprising one or more processors and a non-transitory, computer-readable medium including instructions which, when executed by the one or more processors, cause the one or more processors to:
    capture a first snapshot of a source database on a first node;
    capture one or more transactional logs of one or more changes in the source database;

create a point-in-time clone from the first snapshot and the one or more transactional logs; and capture a second snapshot of the point-in-time clone and, using the second snapshot, creating a second clone on a second node.

12. The system of claim 11, wherein the instructions cause the one or more processors to create the point-in-time clone by applying the one or more transactional logs to the first snapshot.

13. The system of claim 11, wherein the instructions cause the one or more processors to store the point-in-time clone on the first node.

14. The system of claim 13, wherein the first node is located in a first location and the second node is located in a second location different from the first location.

15. The system of claim 13, wherein the instructions cause the one or more processors to store one or more copies of the second clone on additional nodes.

16. The system of claim 11, wherein the instructions cause the one or more processor to capture the first snapshot at a first predetermined time and capture the second snapshot at a second predetermined time according to a protection schedule associated with the source database.

17. The system of claim 11, wherein the point-in-time clone and the second clone reflect a state of the source database when the first snapshot was captured.

18. The system of claim 11, wherein a size of the first clone is greater than the size of the second clone.

19. The system of claim 11, wherein the point-in-time clone includes pointers to data of the source database, and wherein the second clone includes pointers to data of the point-in-time clone.

20. The system of claim 11, wherein the instructions cause the one or more processor to:

store the first clone and one or more copies of the first clone on the first node based on a first replication factor; and store the second clone and one or more copies of the second clone on the second node based on a second replication factor.

* * * * *